United States Patent [19]

Westhaver

[11] 3,970,573

[45] July 20, 1976

[54] ELECTROVISCOUS FLUIDS

[76] Inventor: James W. Westhaver, Box No. 2, Mount Holly, Va. 22524

[22] Filed: Aug. 25, 1975

[21] Appl. No.: 607,217

[52] U.S. Cl. .................................... 252/73; 252/74
[51] Int. Cl.² .......................................... C09K 3/00
[58] Field of Search ................... 252/75, 78, 77, 79, 252/72, 74, 73

[56] References Cited
UNITED STATES PATENTS

| | | | |
|---|---|---|---|
| 2,417,850 | 3/1947 | Winslow | 252/64 X |
| 3,047,507 | 7/1962 | Winslow | 252/74 X |
| 3,250,726 | 5/1966 | Martinek et al. | 252/75 X |
| 3,304,446 | 2/1967 | Martinek et al. | 252/75 X |
| 3,367,872 | 2/1968 | Martinek et al. | 252/75 X |
| 3,385,793 | 5/1968 | Klass et al. | 252/75 |
| 3,397,147 | 8/1968 | Martinek | 252/75 X |
| 3,427,247 | 2/1969 | Peck | 252/75 |

Primary Examiner—Harris A. Pitlick

[57] ABSTRACT

Electroviscous fluids comprising particles of modified starch dispersed in high concentration in a dielectric oil, the particles containing an electrolyte which interrupts their crystallinity, renders them internally semi-conductive, and improves the surface condition of the particles in a manner to enhance their field-induced forces of attraction.

5 Claims, No Drawings

ELECTROVISCOUS FLUIDS

This invention relates to novel suspension in a dielectric oil which exhibit the Winslow Effect, namely, a many-fold increase in shear resistance and viscosity when subjected to strong electric fields. Various compositions of this type are described in Winslow U.S. Pat. Nos. 2,417,850 and 3,047,507, subsequent variations and improvements being described in U.S. Pat. Nos. 3,250,726; 3,304,446; 3,367,872; 3,385,793; and 3,412,031.

The objects of the present invention are to provide non-abrasive electroviscous fluids of high solids concentration, from 0.40 to 0.60 volume fraction, which can be utilized between closely spaced cylindrical electrodes, spaced from 0.0015 in. to 0.0030 in., to form a field responsive vibratory clutch responsive to relatively low voltages ranging from 10 to 100 volts and frequencies from 5 Hz to above 5,000 Hz; to provide fluids which remain stable in characteristics during use; and to provide fluids of this type which are easily formulated by a stirring process.

Initial experiments using cornstarch, as first described by Winslow in U.S. Pat. No. 2,417,850, produced fluids of weak electroviscosity. It was found that this poor performance was due to the tight shell of amylose starch molecules which constituted an excessively thick non-conductive barrier for the starch grains across which most of the voltage drop through the fluid took place. It was discovered that by "opening up" this shell with an electrolyte and water it became semi-conductive; the major portion of the voltage drop becomes shifted to a much thinner capacitative region existing between contacting pairs of particles. As a result, the field strength across the contact regions is greatly increased and this in turn greatly increases the field-induced shear resistance of the fluid. Similar results were obtained when electrolytes were added to rice starch, starch gel, and mucilage of degraded starch.

Other effects of electrolytes in starch particles include modification of the hydrogen bonding within the particles as also enhancement of the field-induced hydrogen bonding between particles. The latter hydrogen bonding is overcome by presence of an adequate amount of water-in-oil type dispersant; however, neither of the hydrogen bonding effects is fully understood. It also appears that electrolytes beneficially increase the smoothness and resilience of the starch particles to thereby decrease the normal viscosity of a fluid of given high volume fraction of solids. In addition, the electrolytes serve in a manner not fully understood to increase the relative capacitance and leakage resistance between contacting particles while decreasing their internal resistance.

Dielectric oils found suitable in formulating the present fluids are a petroleum distillate while oil of 6.0 centipoise viscosity at 100°F and a petroleum distillate transformer oil of 12.0 centipoise viscosity at 100°F. Various other dielectric oils as described in the aforementioned patents relating to silica gel particles in oil can also be used, the preferred viscosity range for the present fluids being from 5 to 15 centipoise at 100°F.

The usual dispersant for electroviscous fluids is of the water-in-oil type; those used for the present fluids were sorbitan mono-oleate; sorbitan sesqui-oleate, and sorbitan mono-laurate. Other dispersants suitable for the purpose, including metallic soaps, are set forth in the aforementioned Winslow patents. These dispersants are oil soluble but in the presence of the starch particles are largely localliced at the particle surfaces; they preclude agglomeration of the starch particles and enable fluid formulations of high volume fraction of solids.

Four types of starch particles have been found effective in accordance with the present invention. These are: (1), whole-grain Belgian rice starch of five micron particle diameter; (2), whole-grain corn starch of food grade, Argo brand, from which, preferably, all grains larger than 10 microns have been removed by settling out from water suspension; (3), dried mucilage of degraded corn starch made by heating the starch in an oven at 350°F until it turns to a tan color; this material, also known as British gum, is dissolved in water to form a mucilage which is then dried on pans in an air stream, the dried mucilage being then milled to a particle size between one half and two microns; and (4), dried starch gel initially formed from cornstarch dispersed in near-boiling water; the gel is then dried on pans in an air stream and milled to a particle size between one half and two microns.

It is found that the amount of electrolyte necessary to form the desired semi-conductivity, etc., of the starch particles should lie between one and ten percent by weight of the starch particles on an anhydrous basis, whereas the amount of water to be added or retained by the starch particles is found for best results to lie in the range of from one to five percent by weight of the starch.

Several procedures have been found effective to incorporate the electrolytes in the starch particles. In one procedure the grains of corn starch or rice starch are mixed in a water solution of the electrolyte to form a thick dilatant batter; this batter is spread on pans and dried below 140°F in an air stream to form a chalk-like material; this material is readily powdered to individual grains in which the electrolyte is imbibed; the powder is then stirred into the dielectric oil using an appropriate amount of dispersant.

In another procedure the electrolytes are dissolved in the hot water used in forming the starch gel or mucilage; on drying, these materials retain the electrolytes between the starch molecules; the dried materials are then milled as above described and the resulting powder is stirred into the dielectric oil using an appropriate amount of dispersant.

In a third procedure the starch in dry powdered form but not containing the electrolyte is stirred into the dielectric oil using an appropriate amount of dispersant; using an amount of powder equal in volume to the volume of oil results in a thick batter. The batter is rapidly stirred using one blade of a common household cake mixer at about 800 r.p.m. A plastic bowl is used to avoid abrasion of metallic particles into the fluid. Stirring warms the batter so that when water is added it will evaporate in time. The electrolyte in desired amount is added in water solution to the stirring batter at a rate just sufficient to cause partial set-up or thickening.

The appropriate amount of dispersant found best suited in formulating the fluids as above described ranges from 1 to 2 percent of the weight of rice starch grains of five micron size; half this amount for fractionated corn starch of eight microns size; and five times this amount for micron size dry gel or mucilage particles.

A typical formulation according to this invention using rice starch particles reaching a volume fraction of particles of 0.50 in which the water, electrolyte, and dispersant are considered parts of the particle volume is the following:

200 g. starch powder, density 1.47 and volume of 136 ml.
4 g. water, density 1.0 and volume of 4.0 ml.
7 g. electrolyte (CaCl$_2$), density 2.3 and volume of 3.0 ml.
3 g. dispersant (sorbitan mono-oleate), density 1.0, volume of 3.0 ml.

The above collectively provide a particle volume of 146 ml. An equal volume of dielectric oil is required for an electroviscous fluid of 0.50 particle volume fraction. The density of the petroleum distillates previously mentioned is 0.80; hence the weight of oil required is 0.80×146 = 117 grams.

Following the stirring of this mixture, a sample of 0.25 ml. is spread between matching steel flat plates of 9.6 sq. in. area to provide a thickness of 0.0016 in. or 0.004 cm.; the plates are supplied with voltages ranging from 10 to 200 at 60 Hz; the force necessary to slide the top plate at a slip speed of one inch per second is measured by pulling the top plate with a spring scales. The slip speed of one inch per second for a thickness of 0.0016 in. provides a shear rate of 625 sec.$^{-1}$, and it is for this shear rate that the compositions were plate tested with but few exceptions. Steel plates of the type used in this work were first disclosed by Winslow in J. of Applied Physics, Vol. 20, No. 12, 1137, 1949.

In addition to the force measurements, the current through the fluid is measured by measuring voltage drop through a series resistor with a vacuum tube voltmeter; other measurements using voltages supplied by a signal generator at frequencies from 5 to 50,000 Hz enabled identification of the capacitances and resistances in the fluids. The fluids were found to be electrically equivalent to a first parallel capacitance and leakage resistance due to the contact regions between particles, this being in series with a second parallel capacitance and resistance due to the particle interiors.

As aforementioned, the amount of water in the particles is preferably in the range of 1 to 5 percent. Commercial corn and rice starch contain from 10 to 15 percent water. Part of this water is displaced by the electrolytes in this invention; the remainder if in excess is evaporated during the stirring process using heat if necessary. The composition of this invention are very sensitive to humidity and, when tested on the aforementioned plates, the fluids can pick up moisture from the air during periods of high humidity resulting in excessive conductivity and can lose moisture to the air during periods of low humidity resulting in deficient conductivity. It is found that best results are obtained when the current at 100 volts and 60Hz for a plate test lies between one and thirty milliamperes; this corresponds at near unity power factor to a volume resistivity of from 1.5×10$^9$ ohm cm. to 0.5×10$^8$ ohm cm. This range is nearly the same as that found by Winslow, U.S. Pat. No. 3,047,507, col. 10, line 70, for fluids based on silica gel powder dispersed in oil to produce what has heretofore been considered the strongest electroviscous fluids.

Electrolytes found suitable for incorporation in the starch include the water soluble chlorides, sulfates, acetates, and fluorides of the monovalent, divalent and trivalent metals and ammonium ion. For example, chlorides found effective include those of sodium, potassium, ammonium, lithium, calcium, magnesium and zinc; sulfates found effective include those of sodium, potassium, manganese, lithium, ammonium, magnesium, aluminum, and iron. Acetates found effective include those of sodium, lithium, potassium, calcium, and magnesium. Fluorides found effective include those of sodium, potassium, and lithium. Weakly soluble hydroxides, such as calcium and magnesium hydroxide, are found to be imbibed by starch particles from a water suspension to render the particles semiconductive. Other effective electrolytes include sodium metaborate, borax, sodium hypochlorite, ammonium hydroxide, and sodium carbonate.

In these formulations the starch particles during field-induced shear resistance are subjected to high stress and it is necessary that they have a high degree of toughness; otherwise the particles are broken to smaller size and the fluid does not have a stable performance. Starch particles are normally toughened by internal hydrogen bonding between the polymer chains of glucose units forming the starch molecules. This toughness can be increased by cross-linking of the starch molecules with known cross-linking agents such as mixed anhydride of acetic and adipic acid, phosphorous oxychloride, metaphosphates, epichlorohydrin, and acrolein.

While the preferred volume fraction of particles in the oil lies between 0.40 and 0.60, a volume fraction appreciably higher than 0.50 requires particles of colloidal size which occupy the interstices of the larger particles. Thus a volume fraction of 0.10 of colloid can be mixed with a volume fraction of five micron rice starch of 0.50 to get a volume fraction of 0.60 and still maintain fluidity of the mixture. The colloidal material can be submicron starch particles or it can be other material such as colloidal casein or magnesium hydroxide.

The foregoing formulations at an average volume fraction of particles of 0.50, when plate tested as described, will show a normal non-potentialized pull of from 0.2 to 1.0 pounds, corresponding to a viscosity of 2 to 10 poise. This normal viscosity ranges from 20 to 100 times the viscosity of the dielectric oil per se and is minimum for starch particles which are somewhat compressible and have smooth surfaces.

The electroviscosity is found to greatly increase with but small increase in the volume fraction of particles. However, the ratio of induced electroviscosity to normal viscosity is found to be nearly constant over the volume fraction range of 0.40 to 0.60. This ratio for a given fluid composition is found to be linearly proportional to the applied voltage except for a small threshold voltage the magnitude of which is inversely proportional to particle size.

In the following examples the ratio of electroviscosity to normal viscosity and the milliamperage current, as obtained from measurements in plate testing the fluids at 100 volts, 60 Hz and fluid thickness of 0.0025 in., are listed. The shear rate was 625 sec.$^{-1}$ and the field strength of 100/0.0025 = 40,000 volts per inch was about half the breakdown strength of the fluids.

| Kind of Particles | Electroviscosity / Normal Viscosity | Current m.a. |
|---|---|---|
| Whole-grain corn starch with | | |
| 6% magnesium chloride | 25 | 24 |
| 4% calcium acetate | 14 | 7 |
| 2% calcium chloride and 1% sodium chloride | 28 | 9 |

-continued

| Kind of Particles | Electroviscosity Normal Viscosity | Current m.a. |
|---|---|---|
| 1% borax and | | |
| 5% casein colloid | 17 | 2 |
| 5% manganese sulfate | 15 | 7 |
| 2% sodium chloride | 28 | 8 |
| 3% sodium fluoride | 17 | 3 |
| 3% zinc chloride | 17 | 2 |
| 5% sodium carbonate | 15 | 2 |
| 6% sodium hypochlorite | 34 | 13 |
| 2% calcium hydroxide | 10 | 3 |
| 2% ammonium chloride | 38 | 30 |
| 2% sodium chloride and | | |
| 2% calcium hydroxide | 46 | 8 |
| 2% sodium acetate | 17 | 10 |
| 2% lithium sulfate | 28 | 2 |
| Dried and powdered gel of cornstarch with | | |
| 10% borax | 30 | 11 |
| 10% calcium hydroxide | 25 | 20 |
| Dried and powdered mucilage of degraded cornstarch with | | |
| 10% borax | 14 | 4 |
| 6% sodium carbonate | 20 | 13 |
| 2% sodium chloride | 22 | 5 |
| Whole-grain rice starch with | | |
| 5% ammonium hydroxide | 39 | 5 |
| 3% calcium chloride | 32 | 3 |
| 2% sodium fluoride | 18 | 8 |
| 2% lithium chloride | 12 | 6 |

A plate test of a fluid with calcium chloride in rice starch at high concentration and at a voltage of 16 instead of 100 gave a normal pull of 1.5 lbs., a potentialized pull of 8.0 lbs., hence a ratio of electroviscosity to normal viscosity of $(8.0-1.5)/1.5 = 4.3$. The current was 2.6 m.a. This fluid thus gave a one-pound pull increase for an increase in voltage on the plates of only 2.5 volts. Such a fluid in a suitable clutch of narrowly spaced electrodes, when potentialized by a d.c. bias and the signal from a radio or the like, can be used to produce powerful loudspeaker action over a very wide range of frequencies.

It will be understood that the term fluid as used herein is intended to embrace both freely flowing liquids and soft grease-like compositions which flow freely under slight shearing forces.

I claim:

1. An electroviscous fluid consisting of a dielectric oil of relatively low viscosity and particles composed essentially of starch dispersed in said oil to a volume concentration of from 40 to 60 percent, said particles including an electrolyte in amount from 1 to 10 weight percent and including water in amount from 1 to 5 weight percent.

2. The electroviscous fluid of claim 1 in which said particles are essentially the dried and powdered gel of cornstarch.

3. The electroviscous fluid of claim 1 in which said particles are essentially the dried and powdered mucilage of degraded cornstarch.

4. The electroviscous fluid of claim 1 in which said particles are essentially whole-grain cornstarch.

5. The electroviscous fluid of claim 1 in which said particles are essentially whole-grain rice starch.

* * * * *